United States Patent
Shan

(10) Patent No.: US 7,752,128 B2
(45) Date of Patent: Jul. 6, 2010

(54) CHARGING NETWORK, CHARGING AGENT APPARATUS AND CHARGING METHOD

(75) Inventor: Mingjun Shan, Guangdong (CN)

(73) Assignee: Huawei Technologies Co., Ltd., Shenzhen (CN)

(*) Notice: Subject to any disclaimer, the term of this patent is extended or adjusted under 35 U.S.C. 154(b) by 303 days.

(21) Appl. No.: 11/494,018

(22) Filed: Jul. 27, 2006

(65) Prior Publication Data

US 2007/0018786 A1 Jan. 25, 2007

Related U.S. Application Data

(63) Continuation of application No. PCT/CN2006/000745, filed on Apr. 20, 2006.

(30) Foreign Application Priority Data

Apr. 20, 2005 (CN) .................. 2005 1 0066099

(51) Int. Cl.
  G06Q 40/00 (2006.01)
  G06F 15/173 (2006.01)
  G06F 15/16 (2006.01)
  H04M 15/00 (2006.01)
(52) U.S. Cl. .................. 705/39; 709/225; 709/223; 709/229; 379/114.03
(58) Field of Classification Search .................. 705/39
  See application file for complete search history.

(56) References Cited

U.S. PATENT DOCUMENTS

| 7,260,193 | B2* | 8/2007 | Zackrisson et al. ..... 379/114.28 |
| 7,526,547 | B2* | 4/2009 | Rodrigo ..................... 709/225 |
| 2002/0120463 | A1* | 8/2002 | Nakamatsu et al. ............ 705/1 |
| 2003/0023550 | A1 | 1/2003 | Lee |
| 2003/0060188 | A1* | 3/2003 | Gidron et al. ............... 455/408 |
| 2003/0091171 | A1* | 5/2003 | Lopez Aladros et al. ...................... 379/114.03 |
| 2003/0229595 | A1* | 12/2003 | Mononen et al. .............. 705/63 |
| 2004/0132465 | A1* | 7/2004 | Mattila et al. ............ 455/456.1 |
| 2004/0167834 | A1* | 8/2004 | Koskinen et al. .............. 705/30 |

FOREIGN PATENT DOCUMENTS

CN  1395391  2/2003

(Continued)

OTHER PUBLICATIONS

"New Products", Telecommunications Americas, Sep. 2004, p. 41.*

(Continued)

*Primary Examiner*—Hani Kazimi
*Assistant Examiner*—Mohammad Z Shaikh
(74) *Attorney, Agent, or Firm*—Leydig, Voit & Mayer, Ltd.

(57) ABSTRACT

The present invention discloses a charging network, including: a service unit, a charging system and a charging agent apparatus; the charging agent apparatus is responsible for connecting the service unit and the charging system, receiving a charging event sent from a service unit, determining a corresponding charging system and generating a charging request according to the information carried in the charging event, and sending the generated charging request to the corresponding charging system. Also, a charging agent apparatus and a charging method are provided by this invention. The charging agent apparatus is added into the charging network, responsible for interacting with service units and charging systems, thus reducing the complexity of the service units as well as the charging network.

20 Claims, 4 Drawing Sheets

FOREIGN PATENT DOCUMENTS

| | | | |
|---|---|---|---|
| CN | 1450748 | | 10/2003 |
| CN | 1397125 A | | 12/2003 |
| EP | 1 469 410 A1 | | 10/2004 |
| JP | 2003-195966 | | 7/2003 |
| WO | WO 01/24122 A1 | | 4/2001 |
| WO | 03/025809 A2 | | 3/2003 |
| WO | WO 03/026268 A2 | | 3/2003 |
| WO | WO 2004/036826 A1 | | 4/2004 |
| WO | WO 2004036826 | * | 9/2004 ................. 705/35 |

OTHER PUBLICATIONS

"Virgin Mobile Deploys Telcordia billing system", RCR Wireless News; Jul. 25, 2005, vol. 24. Issue 30, p. 12-12, 1/9p.*

"Building Quality-of-Service Monitoring Systems for Traffic Engineering and Service Management", Journal of Network and Systems Management, vol. 11. No. 4. Dec. 2003, pp. 1-28.*

Lüttge K., "E-Charging API: Outsource Charging to a Payment Service Provider";; Intelligent Network Workshop, 2001 IEEE May 6-9, 2001, Piscataway, NJ, USA, IEEE, May 6, 2001, pp. 216-222, XP010538420, ISBN: 0-7803-7047-3.

* cited by examiner

CHARGING NETWORK, CHARGING AGENT APPARATUS AND CHARGING METHOD

CROSS-REFERENCE TO RELATED APPLICATIONS

This application is a continuation application of International Application No. PCT/CN2006/000745, filed Apr. 20, 2006, which claims priority in Chinese Application No. 2005-10066099.6, filed Apr. 20, 2005, both of which are entitled "Charging Network, Charging Agent Apparatus and Charging Method". The full disclosure of these applications are hereby incorporated by reference.

FIELD OF THE INVENTION

The present invention relates to charging techniques, and particularly, to a charging network, a charging agent apparatus and a charging method.

BACKGROUND OF THE INVENTION

At present, wireless communication systems are developing rapidly, and along with large-scale using of GPRS systems and 3G communication systems, more and more service types are emerging. As charging may be involved in each kind of service, and usually charging modes of different services are different, each service enabler, which can be referred to as service unit, involved in charging has to interconnect with charging system to implement charging.

Charging network mainly includes a couple of service enablers and several charging systems. The service enabler is an application server, such as Multimedia Messaging Service Center (MMSC), Push-to-Talk over Cellular (POC) server, Presence server, location server, game server, Instant Messaging (IM) server, or Personal Information Management (PIM) server, etc. Charging systems include online charging system and offline charging system. In this case, online charging system can be Intelligence Network (IN) charging system in the operator domain, or a credit card payment system in the Internet domain; and offline charging system can be Operation Support System (OSS) or Billing Support System (BSS). Moreover, charging network may also include Home Subscriber Servers (HSSs), Home Location Registers (HLRs), and customer service management systems, through which service enablers can obtain relevant information.

In the related art, service enablers can directly connect to charging systems and interact with them to implement charging. Since users, e.g., post-paid subscribers, pre-paid subscribers, credit card account users, virtual personal account users of operator charging system, etc., initiating services to service enablers usually have different user properties and account properties, service enablers are usually required to interconnect with different charging systems to implement charging for the services initiated by different users.

The charging network illustrated in FIG. 1 includes four service enablers, namely service enabler 1 through 4, three charging systems, namely charging system 1 through 3, an HLR, an HSS and a customer service center. Here, the charging systems may be offline charging systems or online charging systems, which may belong to different operators or are located in different geographic regions. It can be seen that in this charging network, the service enablers are directly connected to the charging systems and other systems such as HLR, HSS and the customer service center, so the structure of the charging network may be complicated, and multiple interfaces may be needed for each of the service enablers to connect to all these systems, which will lead to the complexity of the service enabler.

Along with the development of communication services, more and more user properties and account properties appear, and service enablers are required to connect to multiple charging systems, which result in complexity of the existing charging network. In addition, direct interaction between service enablers and charging systems may reduce security of the charging network, especially in the case when a service enabler performs interaction with a charging system on the Internet, the direct interaction between an operator domain and the Internet domain may inevitably reduce the security of the whole operator domain. And as service enablers are directly connected to charging systems, it is impossible to correlate and aggregate charging information obtained from several service enablers in a charging operation.

In the deployment of networks, there exist a variety of interfaces with one function, the protocols of which were developed by different organizations of OMA, 3GPP, 3GPP2, ITU and IETF. Thus, the problems related to compatibility and adaptation will emerge in case that a service enabler and a charging system do not support the same interface protocol formulated by an organization, and it will be difficult to implement smooth connection and interworking.

Described above is an introduction of the network composition for implementing service charging in the related art. On the basis of the foregoing network composition, a charging procedure in the related art is illustrated in FIG. 2, and detailed descriptions of the steps are given below:

Step 201: After a subscriber triggers a charging event at a service enabler, the service enabler performs authentication for the user, i.e., verifies whether the user has the right to access the service resources and whether the user is valid. If it is decided that the user has the right to access the service resources and it is valid, the authentication is considered as successful and Step 202 is performed afterwards; otherwise, perform Step 212.

In this step, the service enabler may authenticate the user according to the information stored in itself, or according to relevant information obtained through interaction with external devices such as customer service center, HSS or HLR.

Step 202: The service enabler determines a charging mode and a corresponding charging system for the user according to the user information, and decides whether the charging mode is online charging. If it is online charging, proceed to Step 203; otherwise, proceed to Step 210.

The service enabler may decide the charging mode and the corresponding charging system for the user according to the information stored in itself, or according to relevant information obtained through interaction with external devices such as customer service center, HSS or HLR.

Step 203: The service enabler acquires tariff information. In this step, the service enabler may acquire the tariff information from itself, or from other sources such as rating engine, namely a service tariff information database, or a corresponding online charging system.

Step 204: Authorize the credit of the user according to the acquired tariff information, that is, determine whether the expense of the user exceeds a preset limit of expense. If it doesn't exceed the preset limit of expense, proceed to Step 205; otherwise, proceed to Step 209.

The preset limit of expense may be set in service enabler, or in related external system, such as online charging system, by the system or the user in advance.

Step 205: Generate a reservation request message according to the tariff-related information, and send the message to a corresponding online charging system.

Step 206: After receiving the charging event sent from the service enabler and debiting the user's account, the online charging system returns a reservation confirmation message to the service enabler.

Step 207: After receiving the reservation confirmation message, the service enabler continues with the service. When the service is completed, the service enabler collects statistics on the total consumed amount of the service, calculates the unconsumed amount, and sends the information containing the unconsumed amount to the corresponding charging system.

In this step, if the service enabler finds out that the reservation amount is used up before the service is completed, it will send another reservation request message to the corresponding online charging system, then the procedure will return to Step 205 and its subsequent steps.

Step 208: After receiving the information containing the unconsumed amount, the charging system will return the unconsumed amount to the corresponding account. After that, the procedure is ended.

Step 209: Return a message to the user to inform that the service is terminated due to insufficient credit, and then end the procedure.

Step 210: The service enabler acquires tariff information. In this step, the service enabler may acquire the tariff information from itself, or from other devices such as rating engines, namely service tariff information database, or corresponding offline charging systems.

Step 211: A charging request is generated according to the tariff information acquired and sent to a corresponding offline charging system. The corresponding offline charging system deducts a prescribed amount of money from the corresponding account according to the charging request message received, and then the procedure is ended.

Step 212: The service enabler returns an authentication failure message to the user, and ends the service. After that, the procedure is ended.

Before Step 211, the service enabler may also authorize the credit of the user in the same way as in the online charging procedure.

In the above charging procedures, service enabler need authenticate the user, acquire the tariff information and authorize the credit of the user. Since the relevant information needs to be stored in the service enabler itself, or obtained by the service enabler from other related devices during these procedures, the complexity of the service enabler may be increased.

Additionally, when the relevant information is stored in the service enabler, each service enabler needs to store various kinds of information related to itself, and would not share the information with one another, and it will lead to repetition of mass information and a waste of resources. In the case when the relevant information is obtained by the service enabler from other related devices, each service enabler need set up a direct connection with the device to be interacted with, which may make the charging network more complex as well.

SUMMARY

A charging network includes:
a service unit, generating charging events while services are processed;
charging systems, receiving charging requests and debiting accounts according to the charging requests;
a charging agent apparatus connected to the service unit and the charging systems, receiving a charging event generated by the service unit, determining a corresponding charging system and generating a charging request according to the charging event, and sending the charging request to the corresponding charging system.

A charging agent apparatus in a communication network includes:
an interface module configured to receive charging events from other devices located in the communication network;
a management module configured to assign a corresponding charging system to every the charging events received by the interface module;
a charging module configured to generate a charging request based on one of the charging events, and send the charging request to the corresponding charging system via the interface module.

A charging method includes:
generating a charging event by a service unit, and sending the charging event to a charging agent apparatus;
determining a corresponding charging system according to the charging event received by the charging agent apparatus, generating a corresponding charging request, and sending the charging request to the determined charging system;
debiting an account according to the charging request.

EMBODIMENTS OF THE INVENTION

In an embodiment of the invention, a charging agent apparatus is set up in a charging network, and a service enabler and a charging system may implement interaction through the charging agent apparatus to complete charging for services.

To be a choice, the interaction between a service enabler and a charging system through the charging agent apparatus includes: the service enabler sends a charging event to the charging agent apparatus, and after receiving the charging event, the charging agent apparatus performs processing according to the user information therein, and transmits the charging event to a corresponding charging system.

In another embodiment of the invention, the charging agent apparatus can not only handle the interaction between service enablers and charging systems, but also accomplish functions such as charging authentication, credit authorization and charging information aggregation, etc. The charging agent apparatus may either realize the above functions according to the self-stored information, or interact with other devices, such as a customer service system, an HSS, an HLR, a charging system, a rating engine, etc., to realize those functions.

The invention is further described with an embodiment presented hereinafter.

Figure 1:
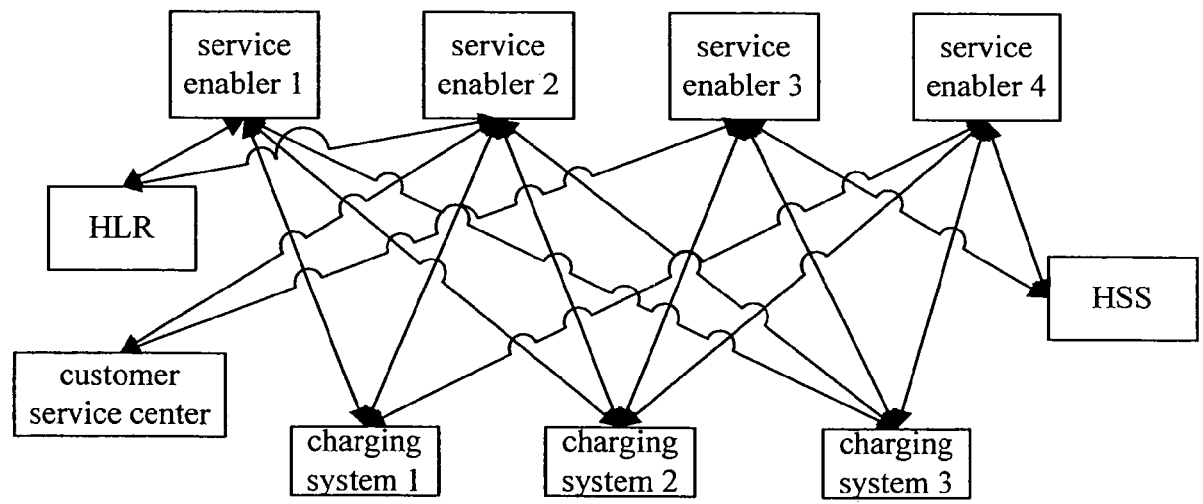
FIG. 1 is a diagram illustrating the structure of a charging network in the related art.
Figure 2:
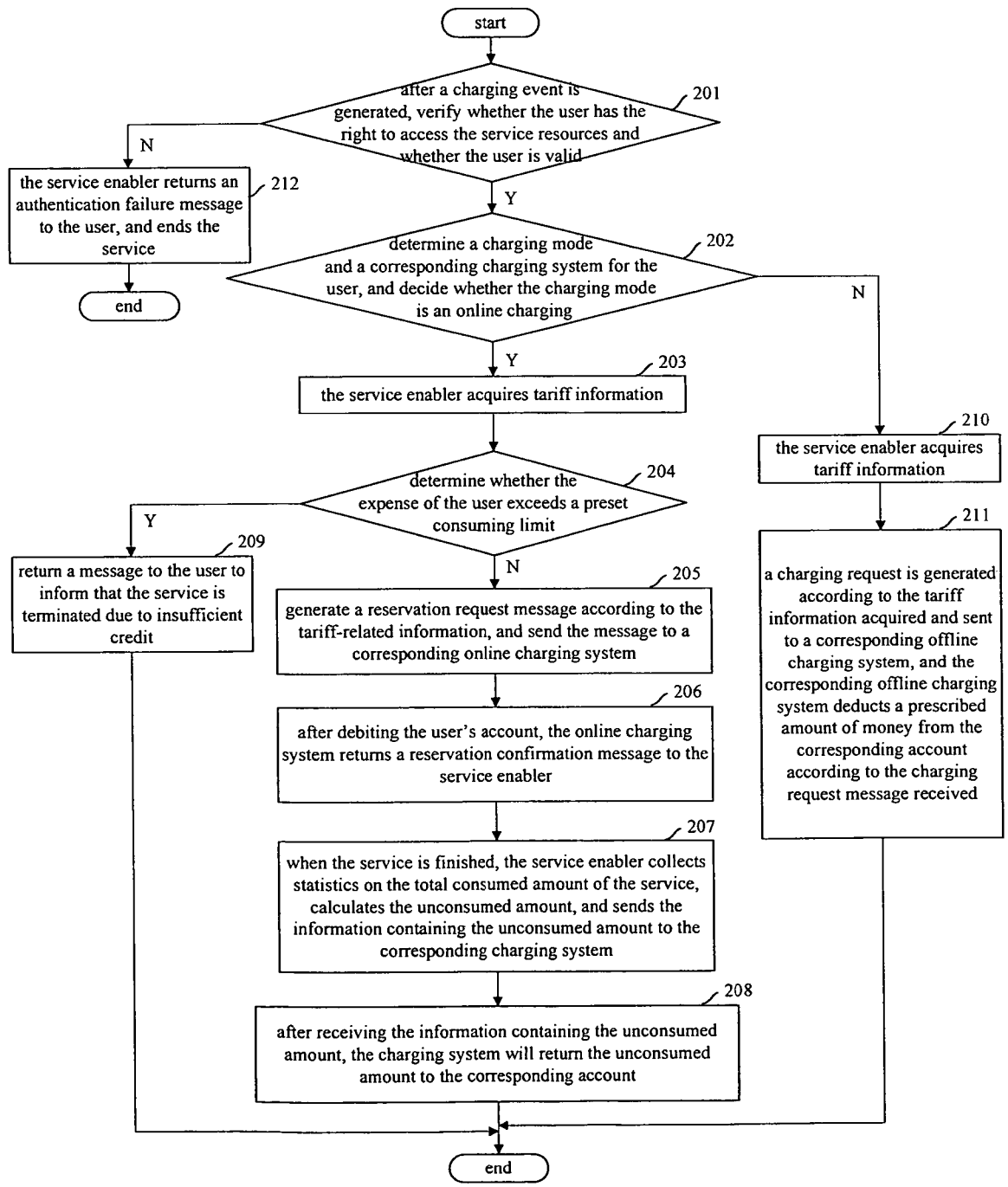
FIG. 2 is a flowchart of the charging method in the related art.
Figure 3:
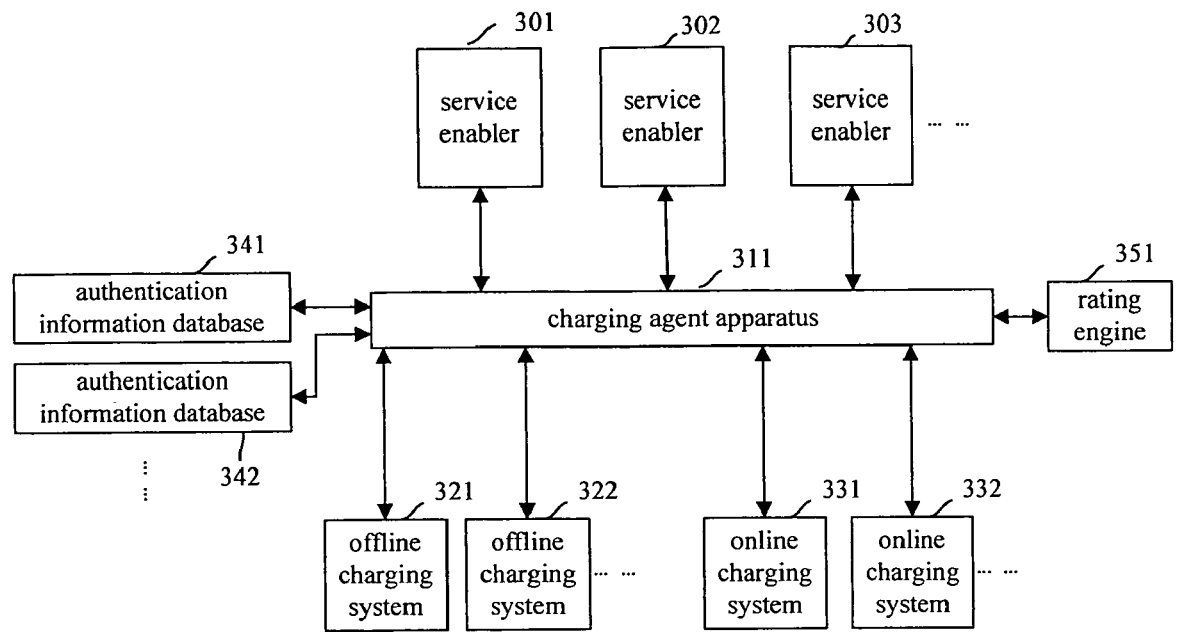
FIG. 3 is a diagram illustrating the makeup of the charging network in an embodiment of the invention.

FIG. 3 is a diagram illustrating the structure of the charging network in an embodiment of the invention. Here, Service enablers 301, 302 . . . , are for handling services initiated by users, and sending charging events to a charging agent apparatus after the charging events are generated. The charging agent apparatus 311 is for implementing authentication and credit authorization for users, and acquiring charging-related tariff information according to the charging events sent from the service enablers 301, 302 . . . , aggregating the tariff information acquired, generating charging requests according to the tariff information acquired, and sending the charging requests to offline charging systems 321, 322 . . . , or online charging systems 331, 332 . . . . The offline charging systems 321, 322 . . . , are for debiting accounts according to the charging requests sent by the charging agent apparatus. The online charging systems 331, 332 . . . , is for debiting accounts according to the charging requests sent by the charging agent apparatus, and after that, returning the charging result information to the charging agent apparatus 311. Authentication information databases 341, 342 . . . , are for storing authentication-related information of users, and interacting with the charging agent apparatus to authenticate users in need of charging. A rating engine 351, namely a service tariff information database, is used to store tariff information, and interact with the charging agent apparatus to provide tariff information to the charging agent apparatus.

The above mentioned service enablers 301, 302 . . . , can be application servers, such as MMSCs, stream service servers, game servers, Push-to-Talk over Cellular servers, Presence servers and location servers. The procedure for generating charging events in the process of services within these servers is the same as that in the related art, and will not be described in detail in this embodiment. The offline charging systems 321, 322 . . . , can be physical entities that have functions to handle Call Detail Records (CDRs) and charging events offline, such as an OSS or a BSS. The online charging systems 331, 332 . . . , can be physical entities, such as an intelligence network charging system or a credit card payment system, which can realize real-time charging. The authentication information databases 341, 342 . . . , are the same as those in the related art, which can be a customer service center, an HLR, or an HSS, etc.

Figure 4:
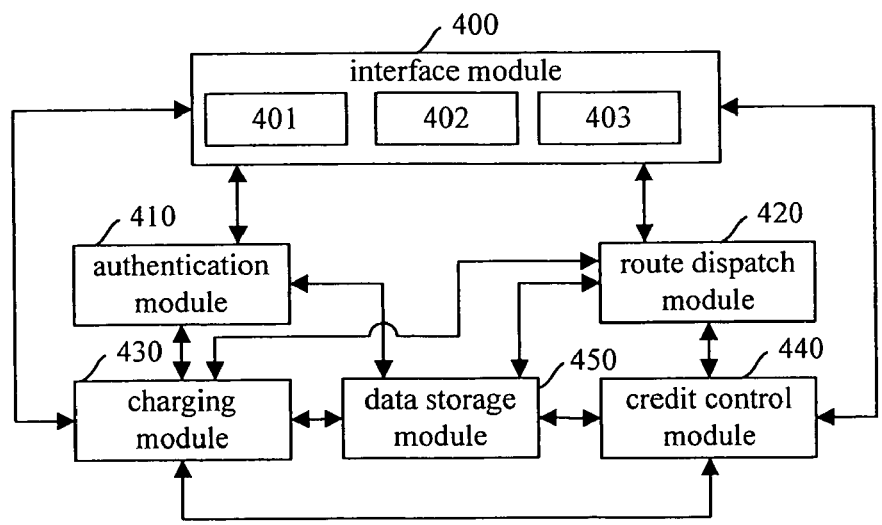
FIG. 4 is a diagram illustrating the structure of a charging agent apparatus in an embodiment of the invention.

FIG. 4 is a diagram illustrating the structure of a charging agent apparatus in an embodiment of the invention. The charging agent apparatus includes an interface module 400, an authentication module 410, a route dispatch module 420, a charging module 430, a credit control module 440 and a data storage module 450. Here, the route dispatch module 420 is a management module of the charging agent apparatus.

The interface module 400 is used for supporting communications of the charging agent apparatus with various external devices, and it includes a variety of interfaces adopted to communicate with other devices in the charging network. Here, the interface 401 between the charging agent apparatus and a service enabler, which can be implemented by an existing standardized interface, functions to adapt and transform interface messages between the charging agent apparatus and the service enabler into messages distinguishable by the charging system, and send the messages to the charging system. The interface may be a Parley X interface, a Web Service interface, or other internal standardized interfaces adopted according to actual network environments. The interface 402 between the charging agent apparatus and the offline charging system may be an FTP interface, an SFTP interface or a FTAM interface, etc. The interface 403 between the charging agent apparatus and the online charging system may adopt a Customized Applications for Mobile network Enhanced Logic (CAMEL) 3 interface, a Diameter interface or a Remote Authentication Dial-In User Service (Radius) interface, etc. As the above mentioned interfaces and the implementation of those interfaces between the charging agent apparatus and other devices are common knowledge in the art, no further description will be given here.

Besides, the authentication module 410 is responsible for verifying a user's right to access service resources, or determining whether a user is valid, etc., according to the user information carried in a charging event received by the interface module 400 and the authentication information stored in the data storage module 450, or according to authentication information acquired by the interface module 400 through interaction with external systems.

The route dispatch module 420 functions to determine a corresponding charging mode and a charging system for a charging event according to the user information in the charging event received by the interface module 400 and relevant information stored in the data storage module 450, or according to relevant information acquired by the interface module 400 through interaction with external systems.

The charging module 430 is adopted to acquire the tariff information related with the charging according to the information in a charging event received by the interface module 400 and the tariff information stored in the data storage module 450, or according to the tariff information acquired by the interface module 400 through interaction with external systems, generate a charging request and send the charging request via the interface module 400 to the charging system determined by the route dispatch module 420, as well as accumulate the consumed amount, calculate the unconsumed amount, generate a corresponding message before sending the message to the charging system determined by the route dispatch module 420 via the interface module 400. Furthermore, the charging module 430 may also check whether the charging events received by the interface module 400 from different service enablers contain an identical service ID, if yes, those charging events with an identical service ID are considered as correlated, thus the charging module 430 will aggregate the tariff information acquired respectively from different correlated charging events, generate one charging request and send the charging request to the charging system determined by the route dispatch module 420 via the interface module 400.

The credit control module 440 is for implementing credit authorization on whether the expense exceeds a preset limit of expense stored in the data storage module 450, or acquired by the interface module 400 through interaction with external systems according to the user information carried in the charging event received by the interface module 400 and the tariff information acquired by the charging module 430.

The data storage module 450 is for storing relevant data and interacting with the modules described above to provide the modules with relevant information.

As the charging procedures which are realized through the interaction of service enablers with a charging agent apparatus and charging systems are generally the same, a charging procedure implemented via the charging network of this embodiment is further described hereinafter by taking, for example, an MMSC as the service enabler.

Figure 5:
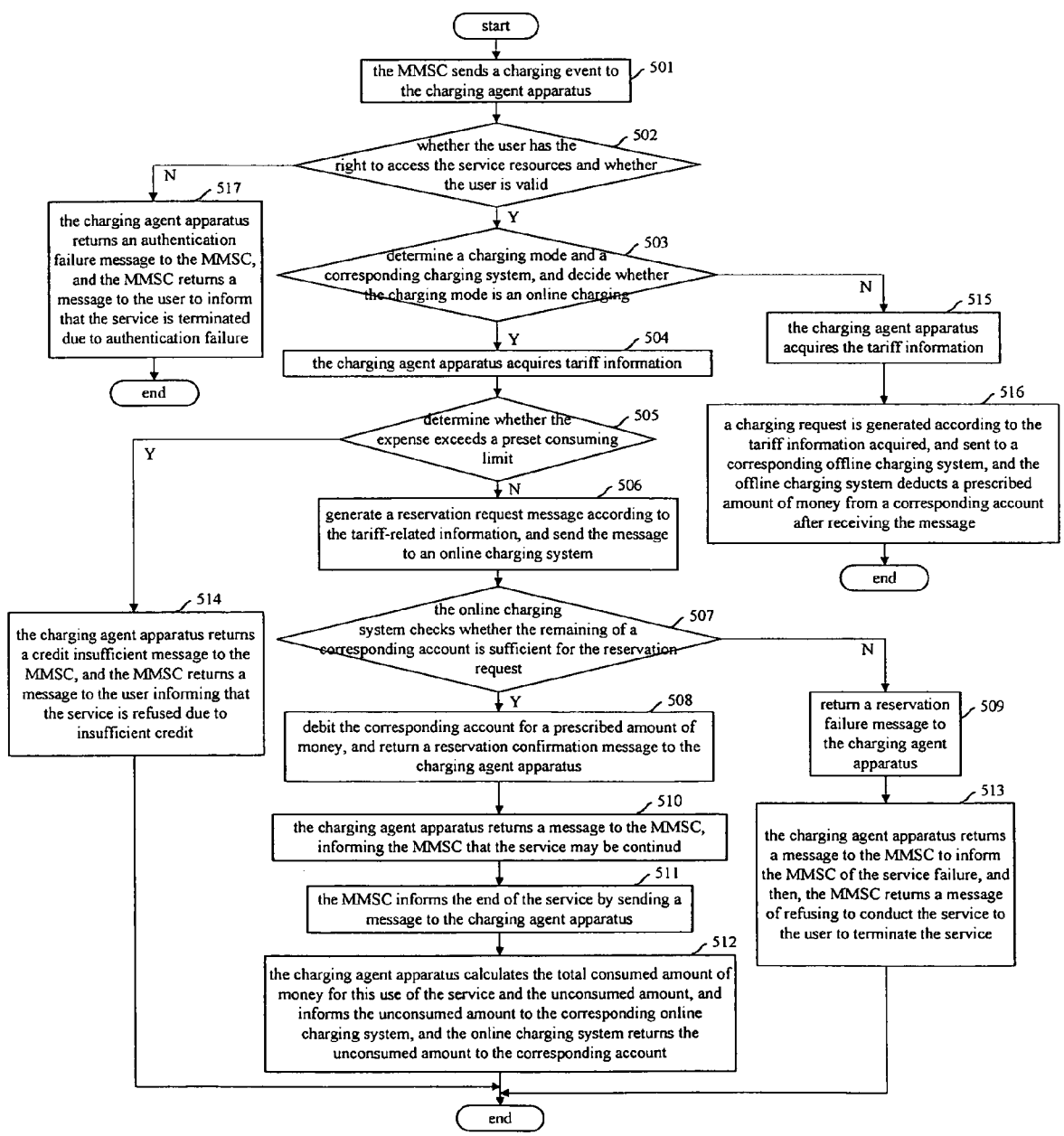
FIG. 5 is a flowchart of the charging method of an embodiment of the invention.

When a service is initiated or running, the charging procedure for the service carried out by an MMSC after a charging event is generated is illustrated in FIG. 5, and detailed descriptions of the steps are given below:

Step 501: The MMSC sends the charging event to the charging agent apparatus, where the charging event includes a user identity, namely a user number, and type identity of the service the user requests to consume.

Step 502: The charging agent apparatus authenticates the user after receiving the charging event, i.e., verifies according to the use identity whether the user has the right to access the service resources and whether the user is valid. If the user is regarded to have the right to access the service resources and the user is valid as well, then perform Step 503; otherwise, perform Step 517.

In this step, the charging agent apparatus may authenticate the user according to the user identity and the information stored in the apparatus itself, or authenticate the user according to the user identity and relevant information obtained through interaction with external devices such as a customer service center, an HSS or an HLR.

Step 503: The charging agent apparatus determines a charging mode and a corresponding charging system according to the user identity, and decides whether the charging mode determined is an online charging. If it is, go to Step 504; otherwise, go to Step 515.

Here, the charging agent apparatus may determine the charging mode and the corresponding charging system for the user according to the information stored in the apparatus itself, or according to the relevant information obtained from external devices such as an HSS or an HLR.

Step 504: The charging agent apparatus acquires tariff information of this service according to the type identity of the service the user requests to consume. In this step, the charging agent apparatus may obtain the tariff information from the self-stored corresponding relations between type identities of services and tariff information according to the type identity of the service the user requests to consume, or it may acquire the tariff information according to the type identity of the service the user requests to consume by interacting with other devices that have stored the tariff information, such as rating engines or corresponding online charging systems.

Step 505: The charging agent apparatus authorizes the credit of the user according to the acquired tariff information, that is, determines whether the expense exceeds a preset limit of expense. If it does not exceed the preset limit of expense, go to Step 506; otherwise, go to Step 514.

The preset limit of expense may be set by systems or users in advance in the charging agent apparatus, or in related external systems such as a corresponding online charging system.

Step 506: Generate a reservation request message including the user identity and reservation amount according to the acquired tariff-related information, and send the message to an online charging system.

Step 507-509: After receiving the reservation request message sent from the charging agent apparatus, the online charging system checks whether the remainder of a corresponding account is sufficient for the reservation request, if it is, debit the corresponding account of a prescribed amount of money, and return a reservation confirmation message to the charging agent apparatus after debiting the account, and then proceed to Step 510; otherwise, return a reservation failure message to the charging agent apparatus and proceed to Step 513.

Step 510: After receiving the reservation confirmation message, the charging agent apparatus returns a message to the MMSC, informing the MMSC that the service may be continued.

Step 511: The MMSC continues with the service after receiving the message for continuing with the service, and informs the end of the service by sending a message to the charging agent apparatus after the service is finished.

If the charging agent apparatus finds out that the reservation amount of money is used up before the service is finished, Step 506 and its successive steps will be executed again until the service is finished.

Step 512: After receiving a message indicating the end of the service, the charging agent apparatus calculates the total consumed amount of money for this service and the unconsumed amount thereof, and informs the corresponding online charging system of the unconsumed amount. The online charging system returns the unconsumed amount to the corresponding account after receiving the message containing the information of unconsumed amount, and then the procedure is ended.

Step 513: After receiving the reservation failure message, the charging agent apparatus returns a message to the MMSC to inform the MMSC of the service failure, and then, the MMSC returns a message refusing to conduct the service to the user to terminate the service. After that, the procedure is ended.

Step 514: The charging agent apparatus returns a credit insufficient message to the MMSC, and after receiving the credit insufficient message, the MMSC returns a message to the user informing that the service is refused due to insufficient credit. Then, the procedure is stopped.

Step 515: The charging agent apparatus acquires the tariff information. In this step, the charging agent apparatus may get the tariff information from itself, or from other devices such as rating engines, i.e., tariff information databases, or corresponding offline charging systems.

Step 516: A charging request is generated according to the tariff information acquired, and sent to a corresponding offline charging system. The offline charging system deducts an appropriate amount of money from a corresponding account after receiving the message, and then the procedure is ended.

Step 517: The charging agent apparatus returns an authentication failure message to the MMSC, and after receiving the message, the MMSC returns a message to the user to inform that the service is terminated due to authentication failure, and then the procedure is ended.

In an offline charging mode of this embodiment, the charging agent apparatus may also authorize the credit of the user, that is, before executing Step 516, check whether the expense of the service exceeds a preset limit of expense, if it doesn't, perform Step 516; otherwise, the charging agent apparatus returns a credit insufficient message to the MMSC, and after receiving the credit insufficient message, the MMSC returns a message to the user informing that the service is refused due to insufficient credit, then the service is terminated. In the offline charging mode, the preset limit of expense may be set by systems or users in advance in the charging agent apparatus, or in related external systems such as a corresponding offline charging system.

In this embodiment, the charging agent apparatus may also perform correlation for charging events from different service enablers, i.e., the charging agent apparatus records service IDs of the received charging events and checks whether the charging events have a same service ID before generating a charging request, if they have, the charging agent apparatus would aggregate the tariff information corresponding to the charging events with the same service ID, and generate one charging request before sending the request to a corresponding charging system. Specific aggregation policies may be flexibly defined according to various services and circumstances, and would not be described in detail in this embodiment. For example, in a certain service, a user may interact simultaneously with a location server and a game server, and the location server and the game server will generate charging events respectively, and send the charging events to the charging agent apparatus. The charging agent apparatus, after receiving the two charging events, finds out that they are charging events belonging to one service according to the service ID contained in these two charging events. Then, the charging agent apparatus will aggregate the tariff information acquired respectively for the two charging events, generate one charging request message, and send the request message to the corresponding charging system.

The foregoing is only a preferred embodiment of this invention, and is not for use in limiting the invention. Any modification, equivalent replacement or improvement made under the spirit and principles of this invention should be covered within the protection scope of this invention.

The invention claimed is:

1. A charging network system, comprising:
   a service unit, generating charging events while services are processed;
   charging systems, receiving charging requests and debiting accounts according to the charging requests;
   a charging agent apparatus connected to the service unit and the charging systems, receiving a charging event generated by the service unit, determining a corresponding charging mode by the charging agent apparatus according to the charging event, and deciding whether the charging mode is an online charging mode,
   if the charging mode is not the online charging mode, the charging agent apparatus determining a corresponding charging system and generating a charging request according to the charging event, and
   if the charging mode is the online charging mode, the charging agent apparatus authorizing the credit of the user corresponding to the charging event by the charging agent apparatus, choosing a corresponding charging system from the charging systems connected to the charging agent apparatus after the credit of the user is authorized, and sending the reservation request as a charging request to the corresponding charging system.

2. The charging network system according to claim 1, further comprising:
   an authentication information database, interacting with the charging agent apparatus to authenticate a user.

3. The charging network system according to claim 2, wherein the authentication information database may be a Home Subscriber Server (HSS), a Home Location Register (HLR), or a customer service center.

4. The charging network system according to claim 1, further comprising:
   a rating engine, storing tariff information and interacting with the charging agent apparatus to provide tariff information to the charging agent apparatus;
   wherein the charging agent apparatus generates a charging request according to the tariff information sent from the rating engine.

5. The charging network system according to claim 1, wherein the charging agent apparatus comprises;
   an interface module configured to receive charging events from other devices located in a communication network;
   a management module configured to assign a corresponding charging system to every said charging events received by the interface module;
   a charging module configured to generate a charging request based on one of the charging events, and send the charging request to the corresponding charging system via the interface module.

6. The charging network system according to claim 5, wherein the charging module acquires tariff information and generates a charging request according to said tariff information.

7. The charging network system according to claim 6, wherein the charging agent apparatus further comprises:
   an authentication module, authenticating the user according to the charging event received by the interface module, and sending the authentication result information to the charging module; and
   the charging module further generates a charging request according to the authentication result information.

8. The charging network system according to claim 6, wherein the charging agent apparatus further comprises:
   a credit control module, authorizing the credit of the user according to the charging event received by the interface module, and the tariff information acquired by the charging module, and sending the credit authorization result to the charging module; and
   the charging module further generates a charging request according to the credit authorization result.

9. The charging network system according to claim 5, wherein the charging module performs correlation for charging events received by the interface module, conducts aggregation for the tariff information corresponding to the different charging events to generate one charging request, and sends the charging request via the interface module to the corresponding charging system determined by the management module.

10. A charging agent apparatus in a communication network, comprising:
    an interface module executed by a processor of the apparatus to receive charging events from other devices located in the communication network;
    a management module executed by the processor of the apparatus to determine a corresponding charging mode according to each of the charging events, and decides whether the charging mode is an online charging mode;
    a charging module executed by the processor of the apparatus to determine a corresponding charging system and generate a charging request according to the charging event if the charging mode is not the online charging mode, and
    to authorize the credit of the user corresponding to the charging event, to choose a corresponding charging system from the charging systems connected to the charging agent apparatus after the credit of the user is authorized, and to send the reservation request as a charging request to the corresponding charging system if the charging mode is the online charging mode.

11. The charging agent apparatus according to claim 10, wherein the charging module is further used for acquiring tariff information and generating a charging request according to the tariff information.

12. The charging agent apparatus according to claim 11, wherein the charging agent apparatus further comprises:
    an authentication module, authenticating the user according to the charging event received by the interface module, and sending the authentication result information to the charging module; and
    the charging module further generates a charging request according to the authentication result information.

13. The charging agent apparatus according to claim 11, wherein the charging agent apparatus further comprises:
    a credit control module, authorizing the credit of the user according to the charging event received by the interface module, and the tariff information acquired by the charging module, and sending the credit authorization result to the charging module; and
    the charging module further generates a charging request according to the credit authorization result.

14. The charging agent apparatus according to claim 10, wherein the charging module is further used for performing correlation for charging events received by the interface module, conducting aggregation for the tariff information corresponding to the different charging events to generate one charging request, and sending the charging request via the interface module to the corresponding charging system determined by the management module.

15. A charging method, comprising:
generating a charging event by a service unit, and sending the charging event to a charging agent apparatus;
determining by the charging agent apparatus a corresponding charging mode according to the charging event, and deciding whether the charging mode is an online charging mode,
if the charging mode is not the online charging mode, determining by the charging agent apparatus a corresponding charging system according to the charging event received by the charging agent apparatus, generating by the charging agent apparatus a corresponding charging request, and sending by the charging agent apparatus the charging request to the determined charging system;
if the charging mode is the online charging mode, authorizing by the charging agent apparatus the credit of the user corresponding to the charging event by the charging agent apparatus, choosing by the charging agent apparatus a corresponding charging system from the charging systems connected to the charging agent apparatus after the credit of the user is authorized, generating by the charging agent apparatus a corresponding reservation request, and sending by the charging agent apparatus the reservation request as a charging request to the chosen charging system; and
debiting an account according to the charging request.

16. The method according to claim 15, wherein the charging agent apparatus generates the charging request according to the tariff information pre-stored in the apparatus itself, or according to the tariff information obtained from other devices.

17. The method according to claim 15, wherein the step of debiting an account comprises:
receiving the charging request by the charging system, deducting a prescribed amount of money from the corresponding account according to the charging request, and returning a reservation confirmation message to the charging agent apparatus; and the method further comprises:

after receiving the reservation confirmation message, sending by the charging agent apparatus a message to a service unit from which the charging event is sent to notify the service unit that the service may be continued;
continuing with the service by the service unit, and after the service processing is finished, sending a message to the charging agent apparatus to inform the ending of the service;
after receiving the message informing that the service is completed, sending the information of the amount of money unconsumed by the service to the charging system by the charging agent apparatus;
processing the corresponding service account by the charging system according to the received unconsumed amount of money, and ending the charging procedure after the processing is completed.

18. The method according to claim 17, wherein after the charging system receives the reservation request, the step further comprises:
checking whether the remainder of the corresponding account is sufficient for the debit request, if it is, performing the step of deducting a prescribed amount of money from the corresponding account according to the charging request; otherwise, performing the step of returning a reservation failure message to the charging agent apparatus, and after receiving the reservation failure message, returning a message by the charging agent apparatus to the service unit to inform failure of the service.

19. The method according to claim 15, wherein after the charging agent apparatus receives the charging event, the step further comprises:
authenticating the user corresponding to the charging event, and after the authentication succeeds, proceeding to the step of choosing a corresponding charging system from the charging systems connected to the charging agent apparatus according to the charging event.

20. The method according to claim 15, wherein before the charging request is generated, the method further comprises:
determining by the charging agent apparatus whether there are charging events among the received charging events that contain the same service ID, if there are, aggregating the tariff information of the charging events with the same service ID, and sending one charging request to the corresponding charging system after aggregation.

* * * * *